(12) United States Patent
Sassoon (10) Patent No.: US 10,889,235 B2
(45) Date of Patent: Jan. 12, 2021

(54) HYBRID BACKUP LIGHT WITH INTEGRATED WARNING LIGHT

(71) Applicant: Charles I. Sassoon, Hauppauge, NY (US)

(72) Inventor: Charles I. Sassoon, Hauppauge, NY (US)

(*) Notice: Subject to any disclaimer, the term of this patent is extended or adjusted under 35 U.S.C. 154(b) by 0 days.

(21) Appl. No.: 16/276,307

(22) Filed: Feb. 14, 2019

(65) Prior Publication Data

US 2019/0248273 A1 Aug. 15, 2019

Related U.S. Application Data

(60) Provisional application No. 62/630,543, filed on Feb. 14, 2018.

(51) Int. Cl.
*B60Q 1/22* (2006.01)
*B60Q 1/50* (2006.01)
*F21S 43/14* (2018.01)
*F21S 43/13* (2018.01)
*F21Y 115/10* (2016.01)

(52) U.S. Cl.
CPC ............... *B60Q 1/22* (2013.01); *B60Q 1/50* (2013.01); *F21S 43/13* (2018.01); *F21S 43/14* (2018.01); *F21Y 2115/10* (2016.08)

(58) Field of Classification Search
CPC .... B60Q 1/22; B60Q 1/50; F21S 43/13; F21S 43/14; F21Y 2115/10; F21V 15/00; F21V 15/013; F21V 15/01; F21V 5/007
See application file for complete search history.

(56) References Cited

U.S. PATENT DOCUMENTS

| 1,699,800 | A | * | 1/1929 | Michel | B60Q 1/2607 |
| | | | | | 362/519 |
| 6,733,134 | B2 | | 5/2004 | Bleiner | |
| 9,896,023 | B1 | * | 2/2018 | Salter | B60Q 1/22 |
| 2010/0124073 | A1 | * | 5/2010 | Kowalczyk | B60Q 1/2607 |
| | | | | | 362/545 |
| 2013/0141908 | A1 | * | 6/2013 | Rodriguez | F21V 5/007 |
| | | | | | 362/240 |
| 2017/0106784 | A1 | * | 4/2017 | Gondhi | B60Q 1/24 |

FOREIGN PATENT DOCUMENTS

WO 95/20502 A1 8/1995

* cited by examiner

*Primary Examiner* — Bao Q Truong
(74) *Attorney, Agent, or Firm* — Stroock & Stroock & Lavan LLP (57) ABSTRACT

Various embodiments of the present invention provide a hybrid backup lamp having a backup light and a laser or LED warning light integrated therewith.

17 Claims, 11 Drawing Sheets

HYBRID BACKUP LIGHT WITH INTEGRATED WARNING LIGHT

CROSS-REFERENCE TO RELATED APPLICATIONS

This application claims the benefit of U.S. Provisional Application No. 62/630,543, filed Feb. 14, 2018, which is incorporated by reference herein in its entirety.

BACKGROUND

Backup lights are the rear-facing lights on the back of a motor vehicle that shine, for example, when the vehicle is in reverse gear or moves backward. Backup lights are not continuously lit when the vehicle is in forward motion. Backup lights are typically white, in accordance with regulations, and can comprise incandescent light bulbs or light-emitting diodes (LEDs).

SUMMARY

Various embodiments of the present invention provide a "hybrid" backup light for a vehicle, namely a dual function light that includes a backup light as well as an integrated warning light. The warning light (which projects onto the ground around the vehicle and may also be referred to as a perimeter light) is integrated with the backup light and is actuated when the backup light is engaged. Thus, a reversing vehicle can provide an early warning to oncoming traffic regarding their current or intended backward movement. In some embodiments, the warning light may be provided by a laser source. The laser may comprise multiple beams or a single beam illuminating the surface of the road. In other embodiments, the warning light may be provided by an LED or other source, which may comprise, for example, a single high-powered LED or a plurality of LEDs with a dedicated warning light function.

In some embodiments, the invention provides a hybrid lamp for a vehicle comprising a backup light configured to be activated when the vehicle is in reverse gear, the backup light comprising one or more backup LEDs; and a warning light integrated with the backup light, the warning light comprising a warning light source and a bridge circuit, wherein the warning light source comprises a laser source or an LED source directed toward the road, and wherein the bridge circuit is configured to activate the warning light source when the backup light is activated.

In some embodiments, the warning light source comprises a laser source, and wherein the lamp includes a housing for the laser within a rear exterior housing of the lamp.

In some embodiments, the laser housing is positioned at an angle of about 45 degrees relative to a vertical axis of the lamp.

In some embodiments, the laser housing extends beyond an outer surface of an exterior lens of the lamp, and a protrusion is provided on the lens to accommodate the laser housing.

In some embodiments, n the warning light source comprises a single high-powered warning LED, and wherein an optical lens portion is provided on an exterior lens of the lamp to focus the light from the warning LED.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of certain embodiments of the application, will be better understood when read in conjunction with the appended drawings. For the purposes of illustrating the devices of the present application, there are shown in the drawings preferred embodiments. It should be understood, however, that the application is not limited to the precise arrangements and instrumentalities shown. In the drawings:

FIG. 15 shows a rendering of two hybrid backup lights of FIG. 10 mounted to a truck and turned on; and FIG. 16 shows a rendering of two hybrid backup lights of FIG. 11 mounted to a truck and turned on.

DETAILED DESCRIPTION

As a vehicle reverses out of a tight location with little clearance around the vehicle, it may be difficult for oncoming traffic, pedestrians, or cyclists to notice the reversing vehicle. Furthermore, the reversing vehicle cannot see around the obstacles that are surrounding it and cannot take caution when executing the maneuver. For example, a truck may be reversing out of a parking spot into which it has pulled in. The parking spot may be lined with one or more obstructions, such as a large fence, trees, other vehicles, etc. These obstructions may block the view of the reversing truck driver from oncoming traffic. As the truck reverses, it will suddenly emerge from behind these obstructions. If, for example, the truck is moving at a significant speed, the sudden emerging of the truck from the parking spot may leave oncoming motorists little time to react to the reversing truck, possibly resulting in a collision.

Embodiments of the present invention address such problems and provide a vehicle backup light with technology to project one or more warning lights onto the road. In some embodiments, the backup light equipped with the warning light technology is configured to be mounted to a commercial vehicle, such as a truck. As the truck reverses, warning lights (e.g., one or more red lines) are projected onto the ground. These lines project behind the truck and onto the road. As oncoming traffic arrives behind the reversing truck, the oncoming traffic can see the red lines even if they cannot see the truck. Thus, the red lines can act as an early warning to the oncoming traffic, and the oncoming traffic can then take the necessary action to prevent a collision.

Figure 1:
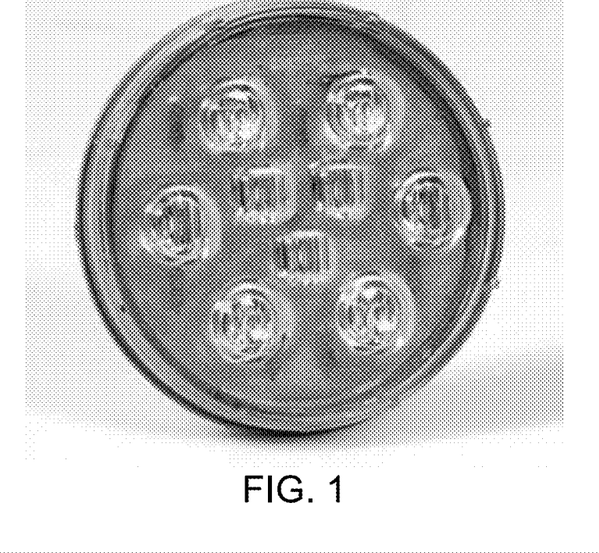
FIG. 1 shows an illustrative standard backup light that may be adapted according to the present invention to incorporate a warning light therein.

FIG. 1 shows an illustrative backup light that may be adapted according to the present invention to include an integrated warning light. The backup light depicted (Maxxima Model Number M42347) is a 4-inch round white LED backup light equipped with nine 8-mm LEDs in a flat back slim profile design. The backup light comprises a polycarbonate lens and housing, and utilizes patented lens technology (see, e.g., U.S. Pat. Nos. 8,009,364 and 8,717, 679, the contents of both of which are incorporated by reference herein in their entirety) along with standard PL-3 connector. The backup light depicted in FIG. 1 has a 180 mA maximum amp draw, a 4.25-inch diameter and a 1.88-inch depth, and a grommet mount. It can be used on commercial vehicles such as, but not limited to, trucks and is useful for fleets and original equipment manufacturers (OEMs).

Figure 2:
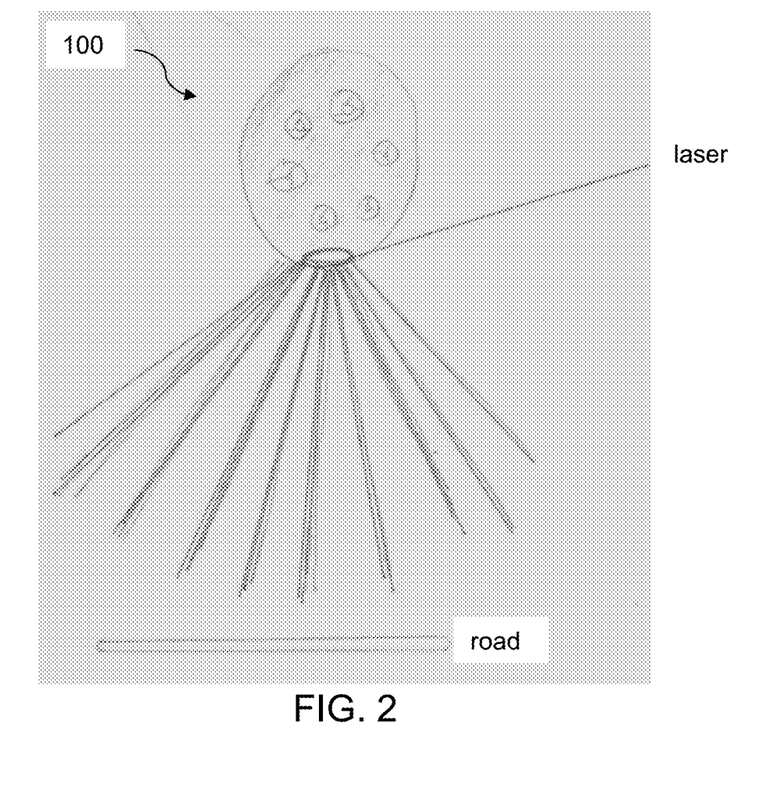
FIG. 2 shows a schematic of an LED backup lamp with safety warning laser beam, according to some embodiments of the invention.
Figure 3:
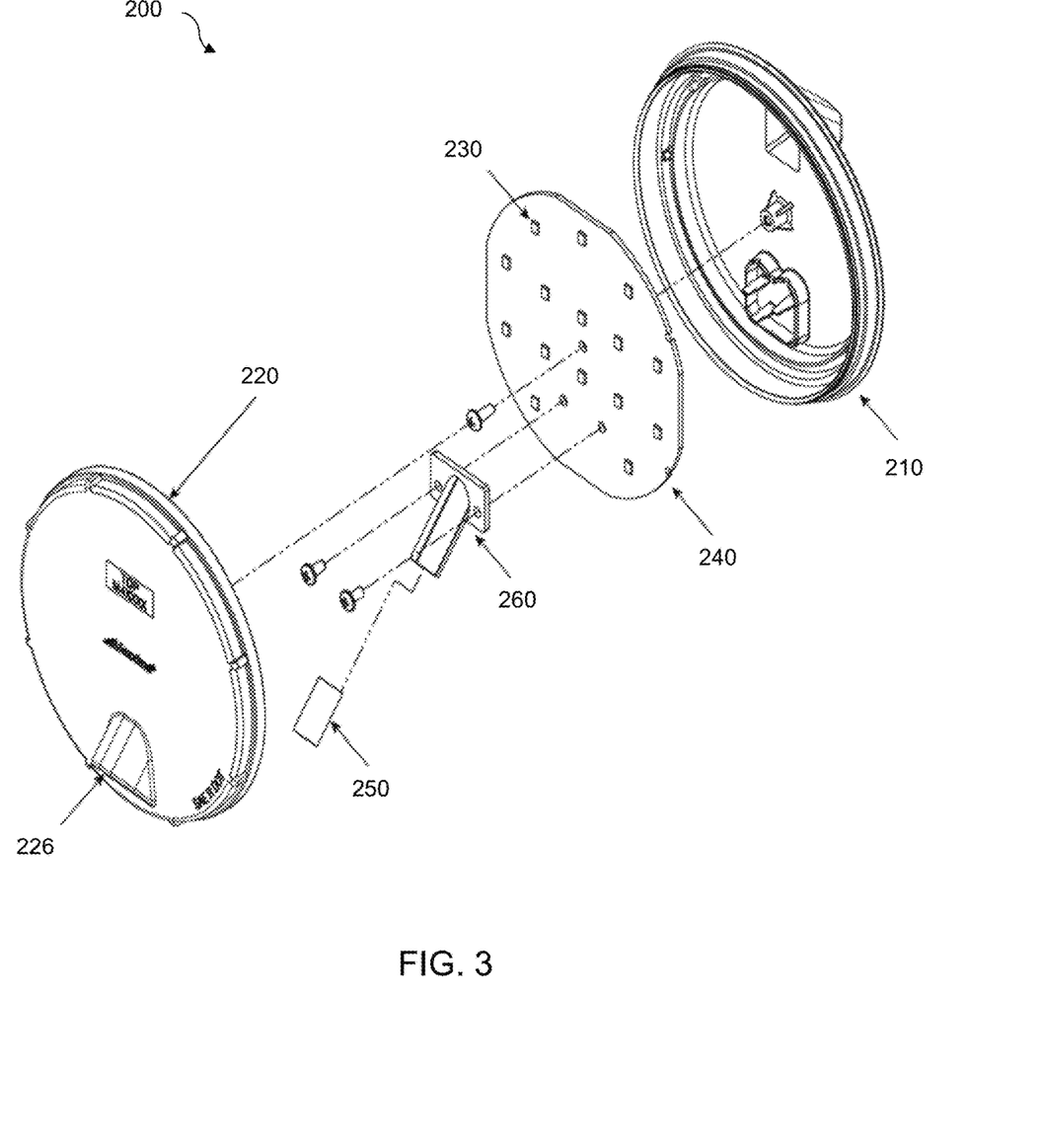
FIG. 3 shows an exploded view of an illustrative hybrid backup light with laser warning light, according to some embodiments of the invention.
Figure 4:
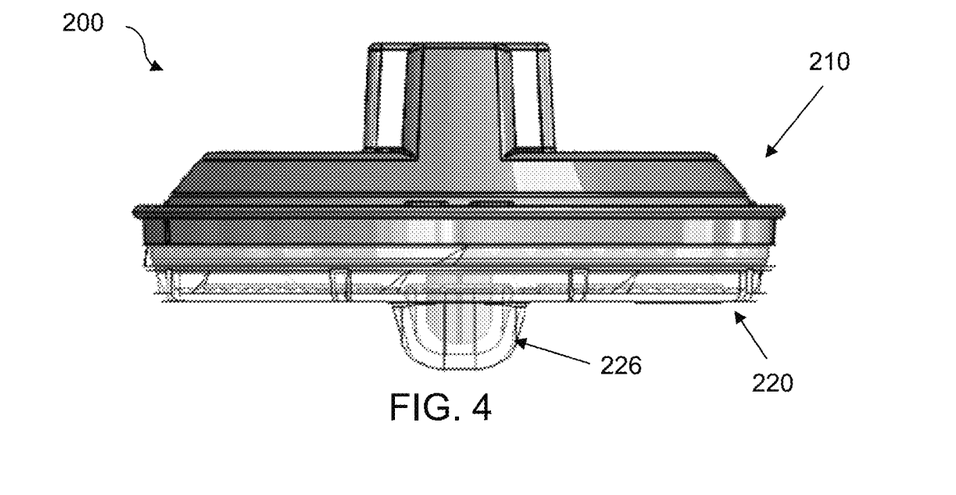
FIG. 4 shows a top view of the hybrid backup light of FIG. 3.
Figure 5:
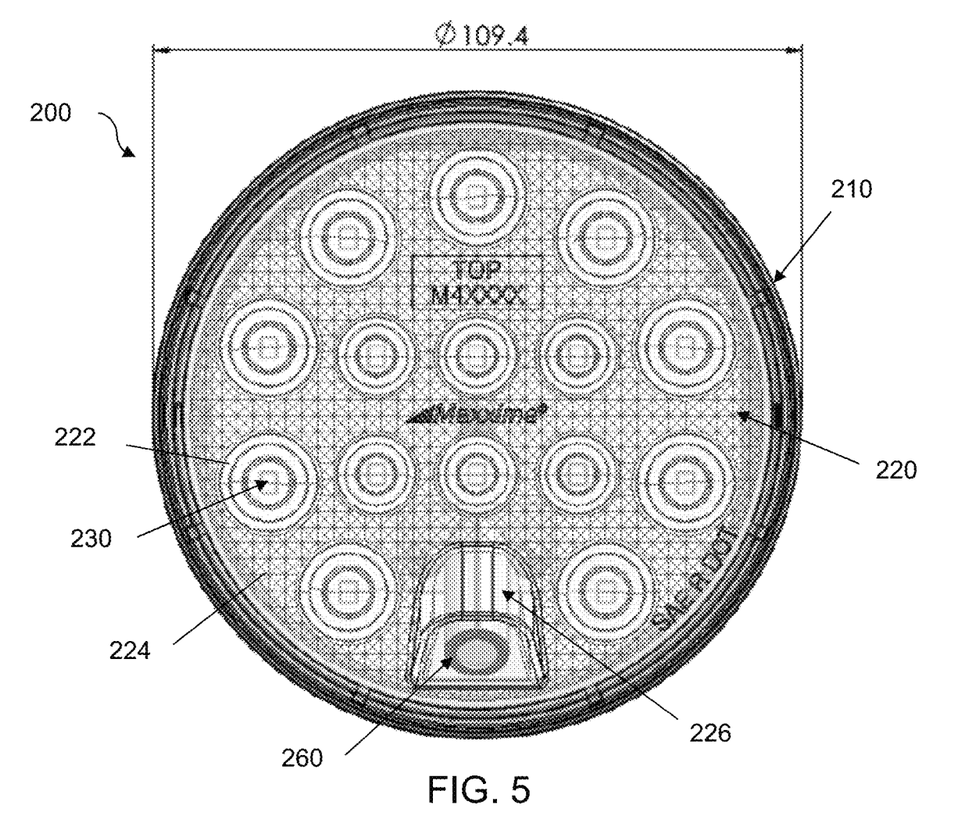
FIG. 5 shows a front view of the hybrid backup light of FIG. 3, with illustrative dimensions marked in mm.

FIG. 2 shows a schematic of an LED backup lamp with safety warning laser beam pointed down on the road, according to some embodiments of the invention. The hybrid lamp 100 of FIG. 2 is similar to the lamp of FIG. 1, but is configured with a laser warning light integrated with the backup light. A window on the bottom of the lamp 100 houses a laser source of light, which is configured (e.g., via a bridge circuit) to be initiated together with the backup light when the truck or other vehicle is engaged in the reverse (backup) movement mode. As shown, the window is relatively small and oval-shaped, but different shapes and/or sizes may be used in other embodiments. Also, in the schematic of FIG. 2, six lens projections are depicted; however, in other embodiments the lens may include other types, configurations, and/or numbers of outward-facing projections (e.g., as shown in FIG. 1), inward-facing projections, and/or no projections.

The laser light is angled in a downwards direction, preferably to project on the (relatively flat) ground about 8-12 feet behind the vehicle or truck body, though other configurations are possible. For example, in alternate embodiments, the warning light may also project sideways, beyond the sides of the vehicle. The purpose of the laser light shining down on the road is to warn oncoming traffic, including pedestrians and other persons, that a truck or other vehicle is backing up and approaching. The laser can be multiple beams or a single beam illuminating the surface of the road.

In some embodiments, a blinking version of the hybrid lamp with a built-in blinking circuit may be provided, in which a blinking function can be initiated to provide an enhanced warning signal to persons in the nearby vicinity of the vehicle. The blinking function can be applied, for example, at 260 flashes per minute, providing ample warning of a truck backing up.

Lasers provide an intense, directional, rich well-defined color. In some embodiments, the laser is provided in a red or green color. In other embodiments, different colors, such as white, may be used. In certain embodiments amber, which is ubiquitous as a warning on all kinds of emergency vehicles (local municipal, police, fire, emergency medical, etc.), may be used.

Particularly with the advent of driverless autonomous vehicles, hybrid LED backup lamps according to embodiments of the present invention can enhance safety and warning of the dangers related to a vehicle backing up and demonstrate the direction the vehicle is heading by providing a warning light pattern on the surface of the road.

In some embodiments, instead of a laser, a single high-powered LED source (or an LED source comprising multiple LEDs) angled downwards can be used to provide the safety warning signal. As for the laser warning light, a blinking function can be applied, for example, at 260 flashes per minute, providing ample warning of a truck backing up. As will be appreciated by those skilled in the art, a different blink circuit specification may be used for the LED warning light as compared to the laser, due to different voltage draws.

The backup light shown in FIG. 1 is just one example of a type of lamp that can be adapted to include an warning light (laser mechanism or other) installed therein according to embodiments of the present invention. In other embodiments, other types and models of standard backup lights may be adapted to implement a laser/LED warning light. For example, the backup lights having an integrated warning light may have different numbers, sizes, types, and/or arrangements of backup LEDs (e.g., 7, 10, 14, 18, 20 LEDs), different lens configurations (colors, textures, patterns, projections, etc. on inner and/or outer lens surfaces, e.g., corresponding to the different LEDs), different lamp shapes (oval, rectangular, etc.) and/or dimensions, different mount types (tape, screws, surface mount, flange mount, etc.), and/or other different features relating to the basic backup light function.

FIGS. 3-8 show exploded, top, front, side, perspective, and back views, respectively, of a hybrid backup light 200, according to certain illustrative embodiments of the invention. With lamp 200 installed, when the vehicle begins to reverse, a laser device 250 integrated into the backup can project a beam of light onto the ground behind the vehicle. This beam of light can project behind the reversing vehicle, for example, by approximately 10 feet, creating a visual depiction of where the vehicle intends to move. In some embodiments, due to government regulations regarding the use of lasers, the laser 250 may be limited in power (e.g., to 5 mW).

The hybrid backup light 200 may utilize, for example, 15 individual LEDs 230 in order to perform standard backup operations (in other embodiments, different numbers of LEDS 230 may be used, as described above). These LEDs 230 may be fixed onto a printed circuit board (PCB) 240 placed within a rear exterior light housing 210. One screw (or other attachment mechanism) may be used to hold the PCB 240 in place within the housing 210. An exterior lens 220 is configured to be fixed over the front of housing 210. In some embodiments, lens 220 may be clear, with a textured inner surface (e.g., with concentric rings 222 or other pattern over one more of the LEDs 230, and a raised pattern/texture 224 over the remainder of the inner surface) and a smooth outer surface. In other embodiments, lens 220 may have different features (projections, etc.), as described above. In some embodiments, light 200 may be round, for example, about 4 inches (109.4 mm) in diameter with a depth of about 2 inches (55 mm). In other embodiments, light 200 may have other shapes and/or dimensions. The lens 220 may be used for reverse light activation. The laser mechanism 250 is preferably configured to activate only when the reversing lights (e.g., LEDs 230) are activated. This can ensure that the laser 250 will only be projected onto the road when the vehicle is reversing or in reverse.

Figure 6:
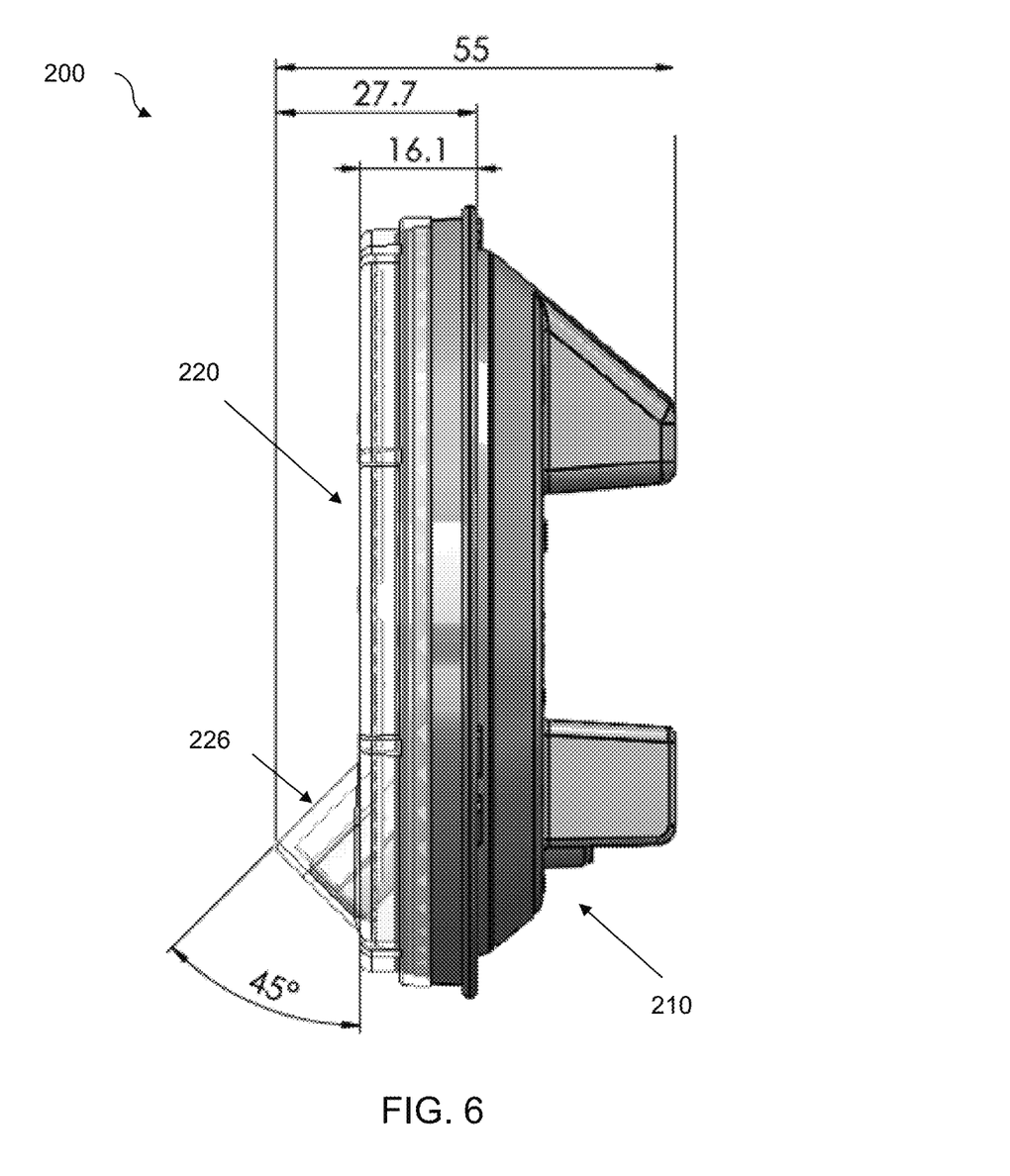
FIG. 6 shows a side view of the hybrid backup light of FIG. 3, with illustrative dimensions marked in mm.
Figure 7:
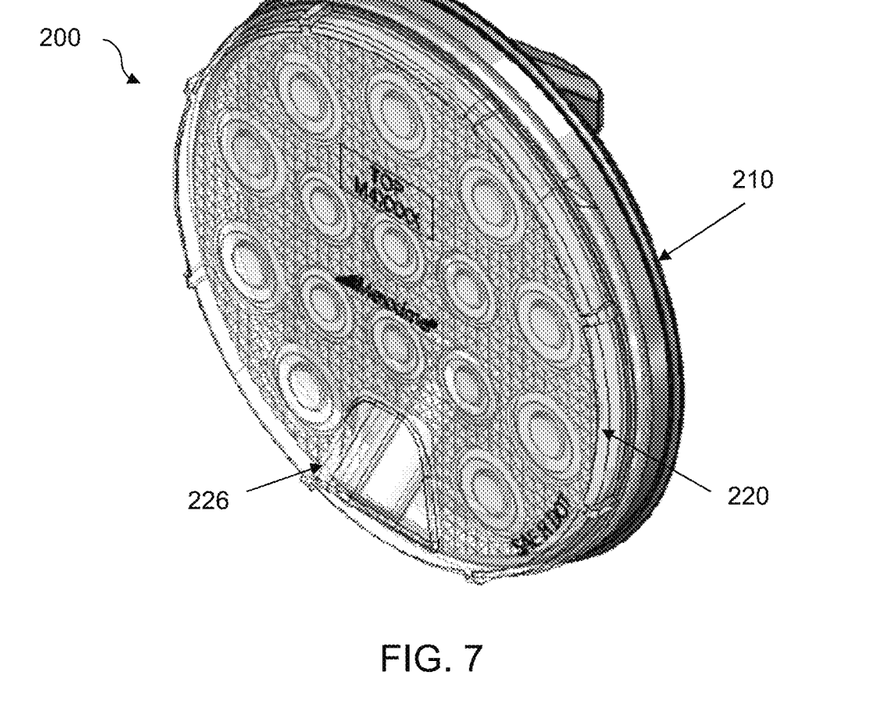
FIG. 7 shows a perspective view of the hybrid backup light of FIG. 3.
Figure 8:
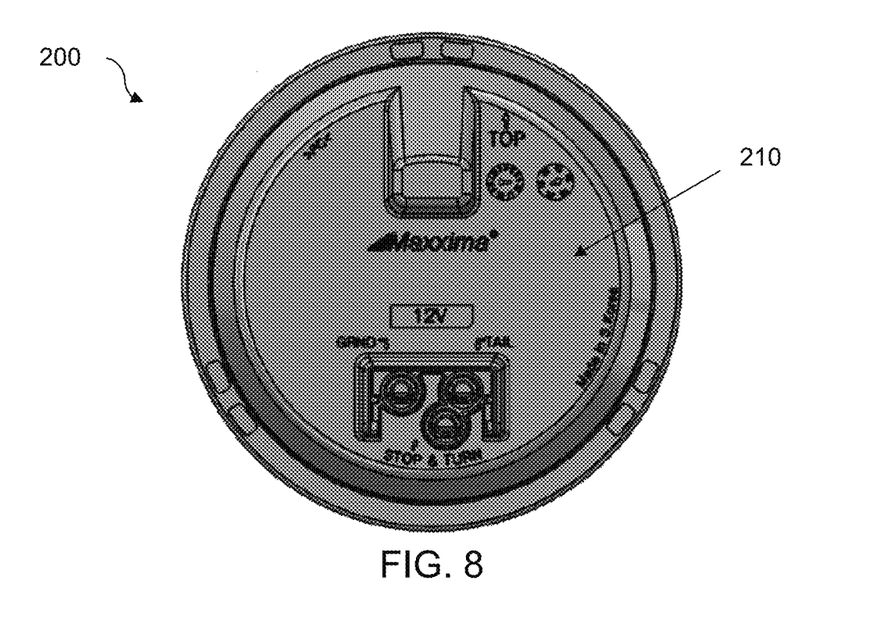
FIG. 8 shows a back view of the hybrid backup light of FIG. 3.

Laser device 250 may be placed within the light housing 210, for example, at the bottom of the light 200. In some embodiments, the laser 250 may protrude outwards from the lens surface, in which case modifications to the lens 220 (e.g., addition of an extension portion such as tubular protrusion 226 to house the laser mechanism 250) may be implemented to ensure proper fitment of the laser 250 within the lens 220. As shown in FIG. 6, the laser housing 226 on the lens 220 may protrude outwards, for example, at a 45 degree angle when measured against the surface of the lens 220 (or alternately, where the lens is not vertical when installed, 45 degrees from vertical, or any other desired angle). Within the rear exterior light housing 210, a separate housing 260 may be provided around the laser 250. This separate housing 260 (i.e., shielding surrounding the laser 250 within the light housing 210) can be affixed to the PCB 240, for example, via two screws (or other attachment mechanism). In some embodiments, laser 250 may be selected with geometry to project a solid line or band of light onto the ground behind the vehicle. This solid line of light may be, for example, about 6 inches wide while extending rearwards of the vehicle. The distance that the line extends may be dependent, for example, upon the height at which the light 200 is mounted. Government regulations in the United States currently require backup lights and taillights to be mounted on the vehicle between 20 and 72 inches above the ground. This variation of light elevation can vary the length of the laser's projection onto the ground. It can also vary, slightly, the width of the laser light beam. In other embodiments, laser 250 may be selected to project with different widths, colors, etc.

Figure 9:
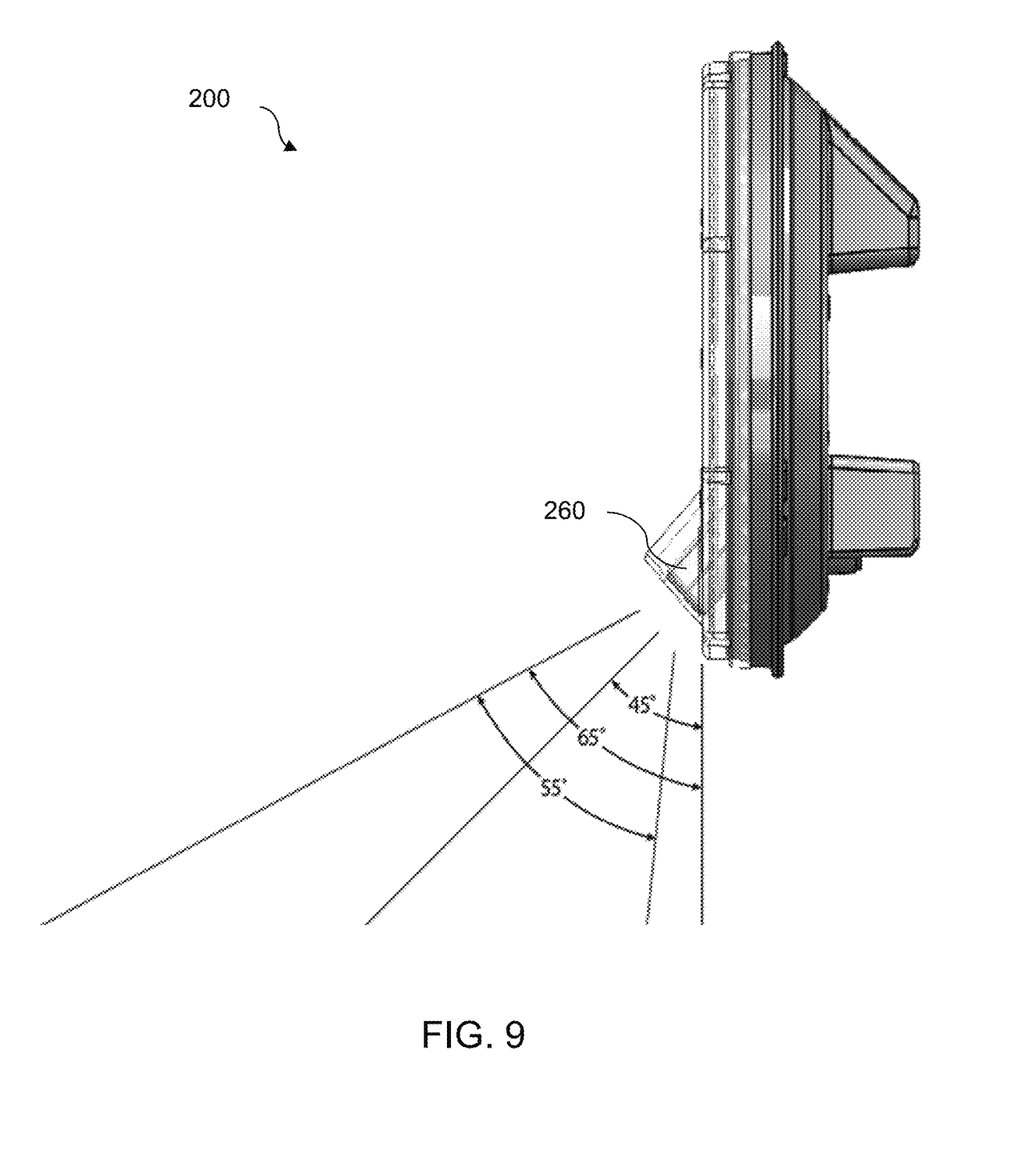
FIG. 9 shows the side view of FIG. 6, with illustrative laser projection angles marked.

In some embodiments, the laser device 250 may project at various angles simultaneously in order to extend the range of the light beam. While the laser housing 260 may be placed at a 45 degree angle, geometry within the laser's lens can extend the range of light projection of the laser 250 while in use. For example, as depicted in FIG. 9, while the centerline of the laser beam may be projected at a 45 degree angle from the backup light 200 (vertical axis line), the edges of the beam may be projected at a range, for example, from roughly 10 degrees downwards from the light 200 to roughly 65 degrees outwards from the light 200. This lighting arrangement can allow for a longer line of light to project away from the vehicle.

Although laser lighting can be focused and can more precisely focus the beam as compared to other light sources, lasers can have certain limitations. For example, the laser may be limited in available power output. The greater the power output of the laser, the more likely it may be to cause serious eye injuries, burn-related injuries, etc. The United States Food and Drug Administration (FDA) has made it unlawful to sell laser products with a power output above 5 mW to the general public. In some locations, the use of laser lighting on the roads is limited due to government regulations. In addition, lasers are relatively expensive.

Figure 10:
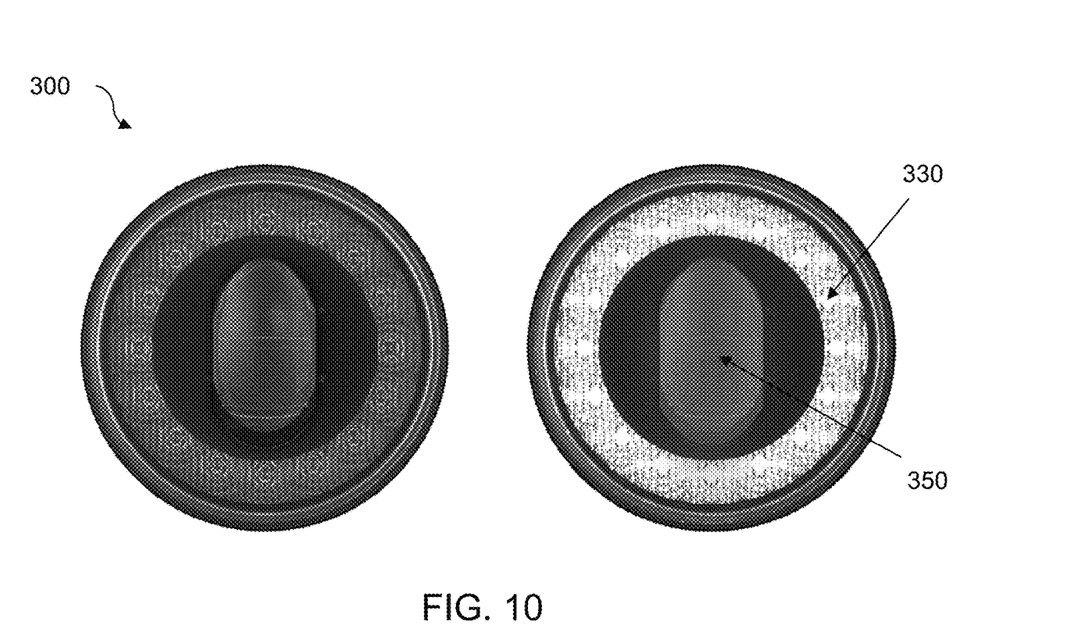
FIG. 10 shows a front view of an illustrative hybrid backup light with LED warning light, according to some embodiments of the invention, in an round form, off (left) and on (right)
Figure 11:
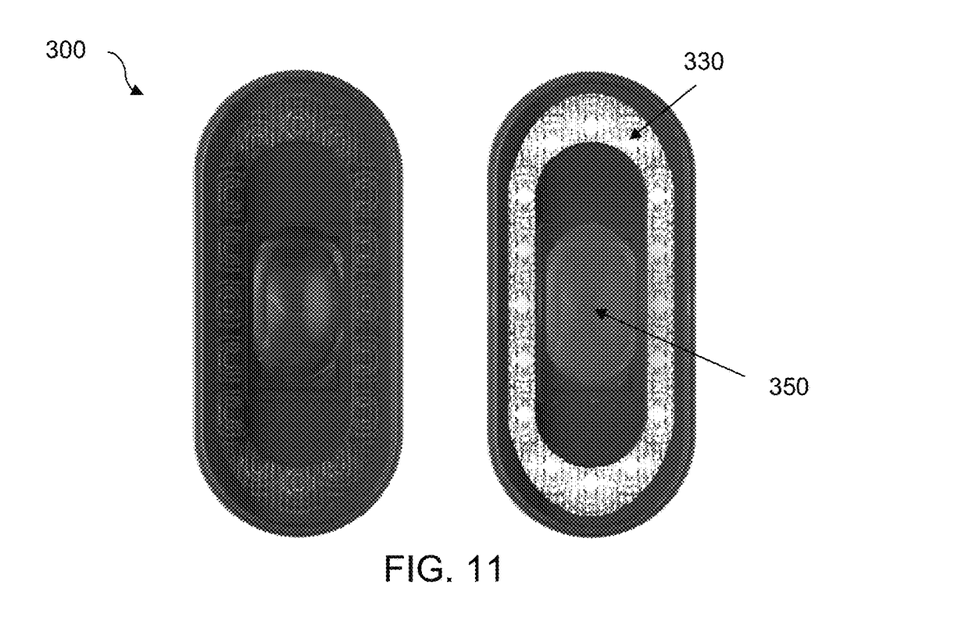
FIG. 11 shows a front view of an illustrative hybrid backup light with LED warning light, according to some embodiments of the invention, in an oval form, off (left) and on (right)
Figure 12:
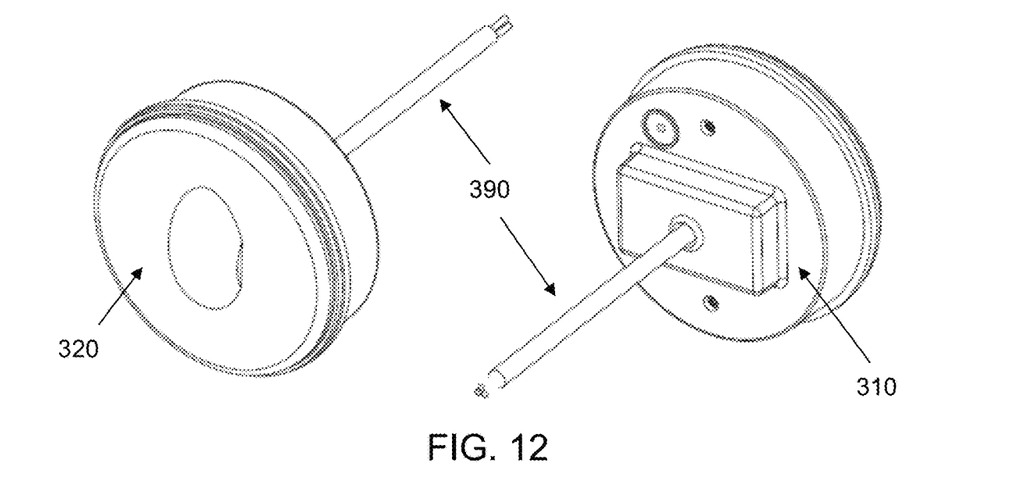
FIG. 12 shows front perspective (left) and back perspective (right) views of the hybrid backup light of FIG. 10.
Figure 13:
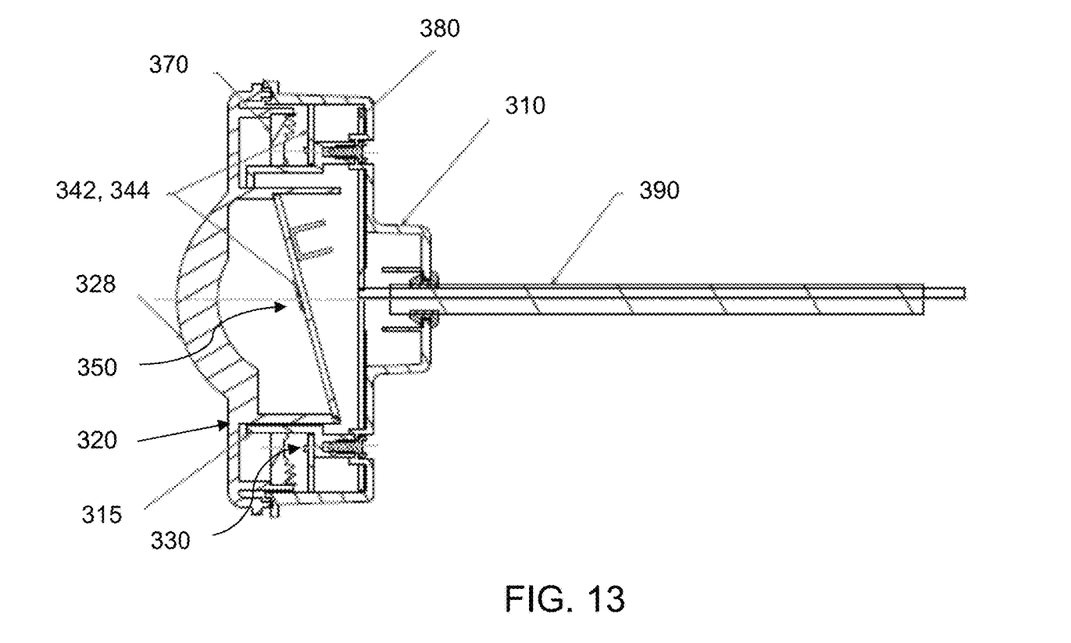
FIG. 13 shows a cross-sectional view of the hybrid backup light of FIG. 10.
Figure 14:
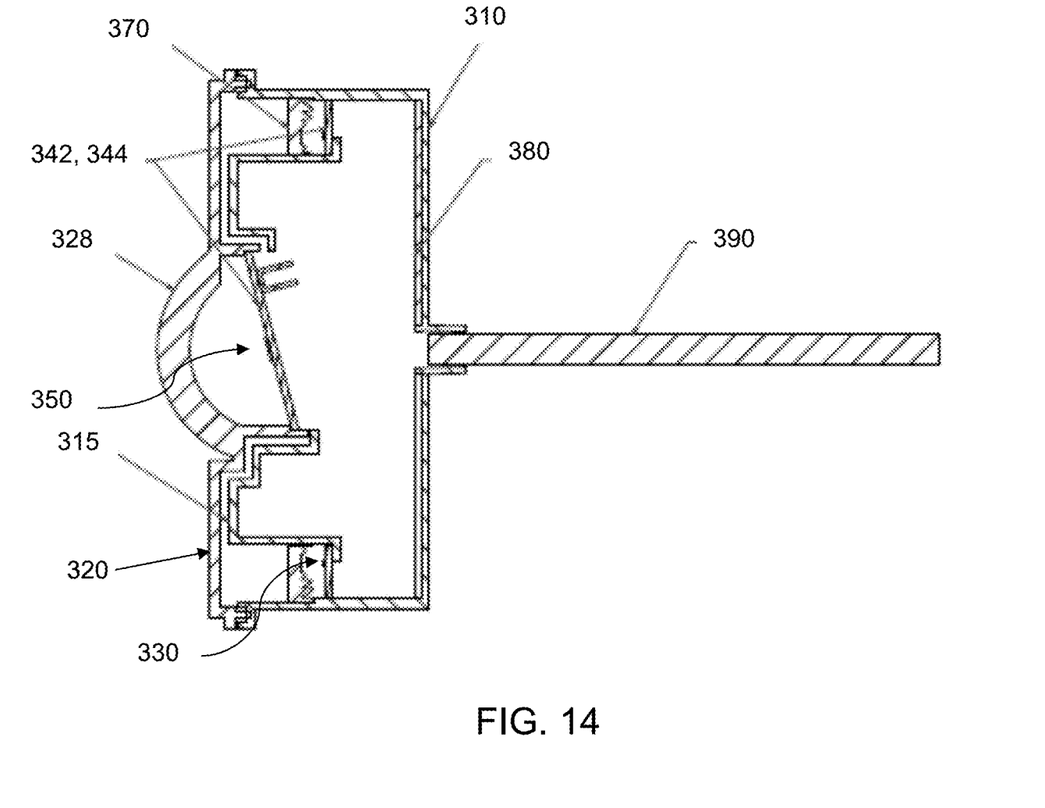
FIG. 14 shows a cross-sectional view of the hybrid backup light of FIG. 11
Figure 15:
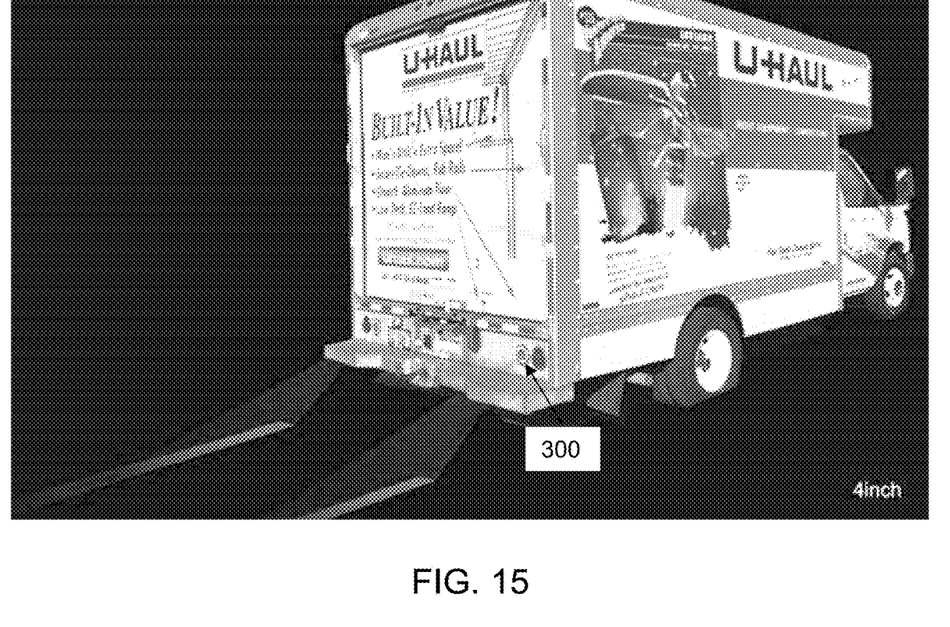
Figure 16:
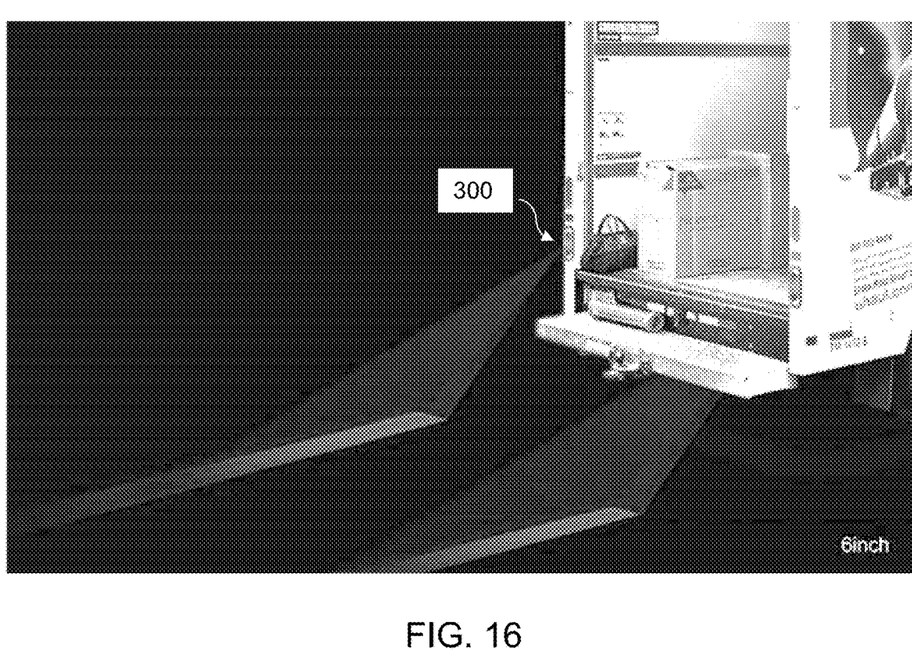

Embodiments of the present invention address these problems as well. For example, as shown in FIGS. 10-16, some embodiments of the invention provide a hybrid backup light 300 having an LED warning light instead of a laser warning light. Like light 200, light 300 is configured to operate only when the vehicle back-up lights are activated (e.g., to indicate to surrounding motorists that the vehicle intends to reverse). Light 300 can be 4-inch round (as shown in FIGS. 10, 12, 13, 15), 6-inch oval (as shown in FIGS. 11, 14, 16), or can have another shape and/or size. FIG. 10 shows a round light 300 off (left) and on (right), and FIG. 11 shows an oval light 300 off (left) and on (right). In some embodiments, light 300 may utilize, for example, 16 individual white LEDs 330 arranged around its outer perimeter in a first compartment in order to perform standard backup operations. These LEDs 330 may be fixed onto a PCB 342 placed in rear exterior housing 310 (which includes power board 380 therein, and wire harness 390 extending rearwardly therefrom). In other embodiments, different numbers, types, and/or arrangements of LEDs 330 may be used. The light from these white LEDs 330 may be diffused to obtain an even lighting appearance (e.g., by texturing on the inner surface of an inner lens 370 positioned above the LEDs 330). In some embodiments, two LEDs 350 at the center of the lamp 300 in a second compartment may be used to provide the warning light function, for example, to provide a boundary delineation line that can project onto the road surface (which may be referred to as a "perimeter" light since it can be used to indicate the width of the reversing vehicle, and thus the outside perimeter into which the vehicle is reversing). A bezel 315 can be provided to block light leakage from one compartment to another and to prevent unwanted light dispersion across the lens. LEDs 350 may be fixed onto a PCB 344 placed in rear exterior housing 310, which may be separate from PCB 342 (in other embodiments, the LEDs of light 300 may be fixed to more boards, or a single board, as a matter of design choice). In other embodiments, other colors, types, and/or positions of one or more LEDs (or a plurality of red or other color LEDs having a dedicated warning light function) may be used.

With LED sources, the light output can be greater than with other light sources. However, the light from LEDs is not as focused as laser light, thus the exterior lens 320 configured to fit over rear light housing 310 may include an optical lens portion 328 (e.g., a convex/positive lens) over LED(s) 350 to convert the light therefrom into shape and allow for configurable lighting geometry. Lens portion 328 may be red (or another color), and may comprise, for example, a convexo-concave lens configured to convert the spread beam of an LED into a straight line projection (or other desired pattern).

In some embodiments, perimeter lighting may be provided when the (e.g., red) LEDs 350 are set to a steady on pattern. In some embodiments, the hybrid light 300 can be set to a specific warning pattern (e.g., where the red LEDs 350 flash). On the rear of the light housing 310, three wires may be utilized. When the standard power wire and ground wire are active, the light 300 may operate as a standard reversing light with the white LEDs 330 illuminating in conjunction with the steady on red LEDs 350 as the red LEDs project a perimeter line onto the road surface. A third wire can be used as a pattern select wire. In some embodiments, when this third wire is powered for a certain time (e.g., one second), the red LEDs 350 will change from a steady on pattern to the next available flash pattern. The number of flash patterns available and the order of the flash patterns may vary in different embodiments. As power is cycled through the third wire, e.g., for one second at a time, the light will cycle through the patterns. The light will remain in the last pattern set by the end user. For example, if the light is powered with the power and ground wires connected and then the end user cycles power through the third wire three times, the light will enter the third flash pattern. Then, for all future startups of the light, the light will automatically enter this third flash pattern that has been selected. If the user wanted to reset the light to its original flash pattern, the user could power the third wire for a longer time (e.g., seven seconds). When the LEDs 350 enter a specified flashing pattern, the intensity of the light emitted may be higher than that of the steady burn pattern due to the characteristics of LEDs. When an LED is on constantly for a long period of time, it may heat up significantly. This excess heat may damage the LED and reduce its lifespan. When the light enters a pattern that will flash, the light will be on for a short duration and then it will turn back off. Flashing patterns will allow the LED to disperse the excess heat into the immediate surroundings and the LEDs will remain cool. Because the LEDs will remain cooler when the light flashes, the LEDs can be operated to their maximum light emission capabilities. This can ensure that the light is brighter when the LEDs flash as compared to when the LEDs operate in the steady on mode.

In some embodiments, each individual hybrid light will be equipped with its own control circuitry. This circuitry may be divided in two sections. A standard LED driver may power the backup light (e.g., the white LEDs). This circuitry is used to control the reversing light function only. The second half of the circuit is used to control the warning light (e.g., the red or other color LEDs). This circuit may comprise an LED driver controlled by an MCU (microcontroller unit). In some embodiments, the white LED driver is not configurable, but the red LED driver may be configurable by powering the third wire, as discussed above. In some embodiments, a user may be able influence the warning LED driver to select a desired flash pattern for the warning light (e.g., steady ON, slow warning flash, fast warning flash, double flash, etc.).

While there have been shown and described fundamental novel features of the invention as applied to the preferred and illustrative embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, various features and structures of the different embodiments discussed herein may be combined and interchanged. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

The invention claimed is:

1. A hybrid lamp for a vehicle, comprising:
a backup light configured to be activated when the vehicle is in reverse gear, the backup light comprising a plurality of white backup LEDs constructed and arranged to provide diffused light with an even lighting appearance; and
a warning light integrated with the backup light, the warning light comprising a warning light source comprising a laser source or an LED source constructed and arranged to project a line of light onto the ground behind the vehicle, thereby creating a visual depiction of where the vehicle intends to move; and a bridge circuit configured to activate the warning light source when the backup light is activated.

2. The hybrid lamp of claim 1, wherein the warning light source comprises a laser source, and wherein the lamp includes a housing for the laser within a rear exterior housing of the lamp.

3. The hybrid lamp of claim 2, wherein the laser housing is positioned at an angle of about 45 degrees relative to a vertical axis of the lamp.

4. The hybrid lamp of claim 2, wherein the laser housing extends beyond an outer surface of an exterior lens of the lamp, and a protrusion is provided on the lens to accommodate the laser housing.

5. The hybrid lamp of claim 1, wherein the warning light source comprises an LED source comprising a single high-powered warning LED or a plurality of LEDs having a dedicated warning light function, and wherein an optical lens portion is provided on an exterior lens of the lamp to focus the light from the warning LED(s).

6. A hybrid lamp for a vehicle, comprising:
a backup light configured to be activated when the vehicle is in reverse gear, the backup light comprising one or more backup LEDs; and
a warning light integrated with the backup light, the warning light comprising a warning light source and a bridge circuit, wherein the warning light source comprises a laser source directed toward the road when the lamp is installed on the vehicle, and wherein the bridge circuit is configured to activate the warning light source when the backup light is activated,
wherein the lamp includes a housing for the laser within a rear exterior housing of the lamp, and wherein the laser housing is positioned at an angle of about 45 degrees relative to a vertical axis of the lamp.

7. A hybrid lamp for a vehicle, comprising:
a backup light configured to be activated when the vehicle is in reverse gear, the backup light comprising one or more backup LEDs; and
a warning light integrated with the backup light, the warning light comprising a warning light source and a bridge circuit, wherein the warning light source comprises a laser source directed toward the road when the lamp is installed on the vehicle, and wherein the bridge circuit is configured to activate the warning light source when the backup light is activated,
wherein the lamp includes a housing for the laser within a rear exterior housing of the lamp, and wherein the laser housing extends beyond an outer surface of an exterior lens of the lamp, and a protrusion is provided on the lens to accommodate the laser housing.

8. The hybrid lamp of claim 1, further comprising a blinking circuit configured to initiate a blinking function on the warning light to provide an enhanced warning signal.

9. The hybrid lamp of claim 8, wherein the blinking function is applied at about 260 flashes per minute.

10. The hybrid lamp of claim 1, wherein the warning light source comprises a laser source having a power that does not exceed 5 mW.

11. The hybrid lamp of claim 5, wherein the optical lens portion comprises a positive lens.

12. The hybrid lamp of claim 5, wherein the warning light source is positioned in a center area of the lamp, surrounded by the backup light and separated therefrom by a bezel.

13. The hybrid lamp of claim 5, wherein a standard power wire and a ground wire provide power for the lamp, and a third wire functions as a pattern select wire for a user to select different flash patterns for the warning LED(s).

14. The hybrid lamp of claim 5, wherein the backup light and the warning light each have their own control circuitry.

15. The hybrid lamp of claim 14, wherein the warning light circuitry comprises an LED driver controlled by a microcontroller unit (MCU).

16. The hybrid lamp of claim 1, wherein the warning light source projects one or more red lines of light onto the ground behind the vehicle.

17. The hybrid lamp of claim 1, wherein the hybrid lamp is configured to be mounted to a commercial vehicle.

* * * * *